United States Patent
Ma

(10) Patent No.: US 7,095,578 B2
(45) Date of Patent: Aug. 22, 2006

(54) DETECTION OF FLY HEIGHT CHANGE IN A DISK DRIVE USING HEAD DRAG

(75) Inventor: Yiping Ma, Layton, UT (US)

(73) Assignee: Iomega Corporation, San Diego, CA (US)

(*) Notice: Subject to any disclaimer, the term of this patent is extended or adjusted under 35 U.S.C. 154(b) by 122 days.

(21) Appl. No.: 11/019,483

(22) Filed: Dec. 21, 2004

(65) Prior Publication Data

US 2006/0132961 A1   Jun. 22, 2006

(51) Int. Cl.
*G11B 21/02* (2006.01)
(52) U.S. Cl. ....................... 360/75; 360/73.03
(58) Field of Classification Search ............ None
See application file for complete search history.

(56) References Cited

U.S. PATENT DOCUMENTS

| | | | | |
|---|---|---|---|---|
| 5,309,301 A | * | 5/1994 | Gregory et al. | 360/137 |
| 5,412,519 A | * | 5/1995 | Buettner et al. | 360/73.03 |
| 5,850,321 A | * | 12/1998 | McNeil et al. | 360/246.2 |
| 6,587,301 B1 | * | 7/2003 | Smith | 360/75 |

* cited by examiner

*Primary Examiner*—Kim Wong
(74) *Attorney, Agent, or Firm*—James T. Hagler

(57) ABSTRACT

A method for detecting a change in fly-height comprises measuring motor currents at various radii at a regular interval to determine the head drag. If any of the head drags at the various radii are greater than a threshold value, it is determined that a decrease in fly-height has occurred. If the disk drive has a head cleaner, a head cleaning is initiated to correct the fly-height change. If no head cleaning is necessary, a general error signal may be generated to indicate potential drive failure.

11 Claims, 2 Drawing Sheets

DETECTION OF FLY HEIGHT CHANGE IN A DISK DRIVE USING HEAD DRAG

TECHNICAL FIELD

This invention relates to computer storage products, and more particularly to detecting changes in fly height for disk drives.

BACKGROUND

A disk drive is a data storage device that stores data in concentric tracks on a disk. Data is written to or read from the disk by spinning the disk about a central axis while positioning a transducer near a target track of the disk. During a read operation, data is transferred from the target track to an attached host through the transducer. During a write operation, data is transferred in the opposite direction.

During typical disk drive operation, the transducer does not contact the surface of the disk. Instead, the transducer rides along a cushion of air generated by the motion of the disk. The transducer is normally mounted within a slider structure that provides the necessary lift in response to the air currents generated by the disk. The distance between the transducer/slider and the disk surface during disk drive operation is known as the "fly height" of the transducer.

The fly height is controlled by the suspension attached to the slider and the airbearing of the slider. For magnetic purposes, the fly height is measured as a distance between the read/write elements and the magnetic surface. There are several conditions that create disturbances between the airbearing and the disk surface that can change the fly height. These conditions include altitude, temperature, and contamination. An extreme in any of these conditions will degrade the error rate performance of the drive. These conditions are taken into account during the development of the airbearing designs.

Because the transducer is held aloft during disk drive operation, friction and wear problems associated with contact between the transducer and the disk surface are usually avoided. However, due to the extremely close spacing of the heads and disk surface, any contamination of the read-write heads or disk platters can lead to a head crash—a failure of the disk in which the head scrapes across the platter surface, often grinding away the thin magnetic film. For giant magnetoresistive head technologies (GMR heads) in particular, a minor head contact due to contamination (that does not remove the magnetic surface of the disk) could still result in the head temporarily overheating, due to friction with the disk surface, and renders the disk unreadable until the head temperature stabilizes.

What is needed is a disk drive that can monitor the fly-height and take corrective action upon the first indication of a change in the fly-height. Preferably this monitoring would be accomplished without adding components to the increase the cost of the drive.

SUMMARY

A method for detecting a change in fly-height comprises measuring motor currents at various radii at a regular interval to determine the head drag. If any of the head drags at the various radii are greater than a threshold value, it is determined that a decrease in fly-height has occurred. If the disk drive has a head cleaner, a head cleaning is initiated to correct the fly-height change. If no head cleaning is necessary, a general error signal may be generated to indicate potential drive failure.

DESCRIPTION OF DRAWINGS

These and other features and advantages of the invention will become more apparent upon reading the following detailed description and upon reference to the accompanying drawings.

DETAILED DESCRIPTION

Figure 1:
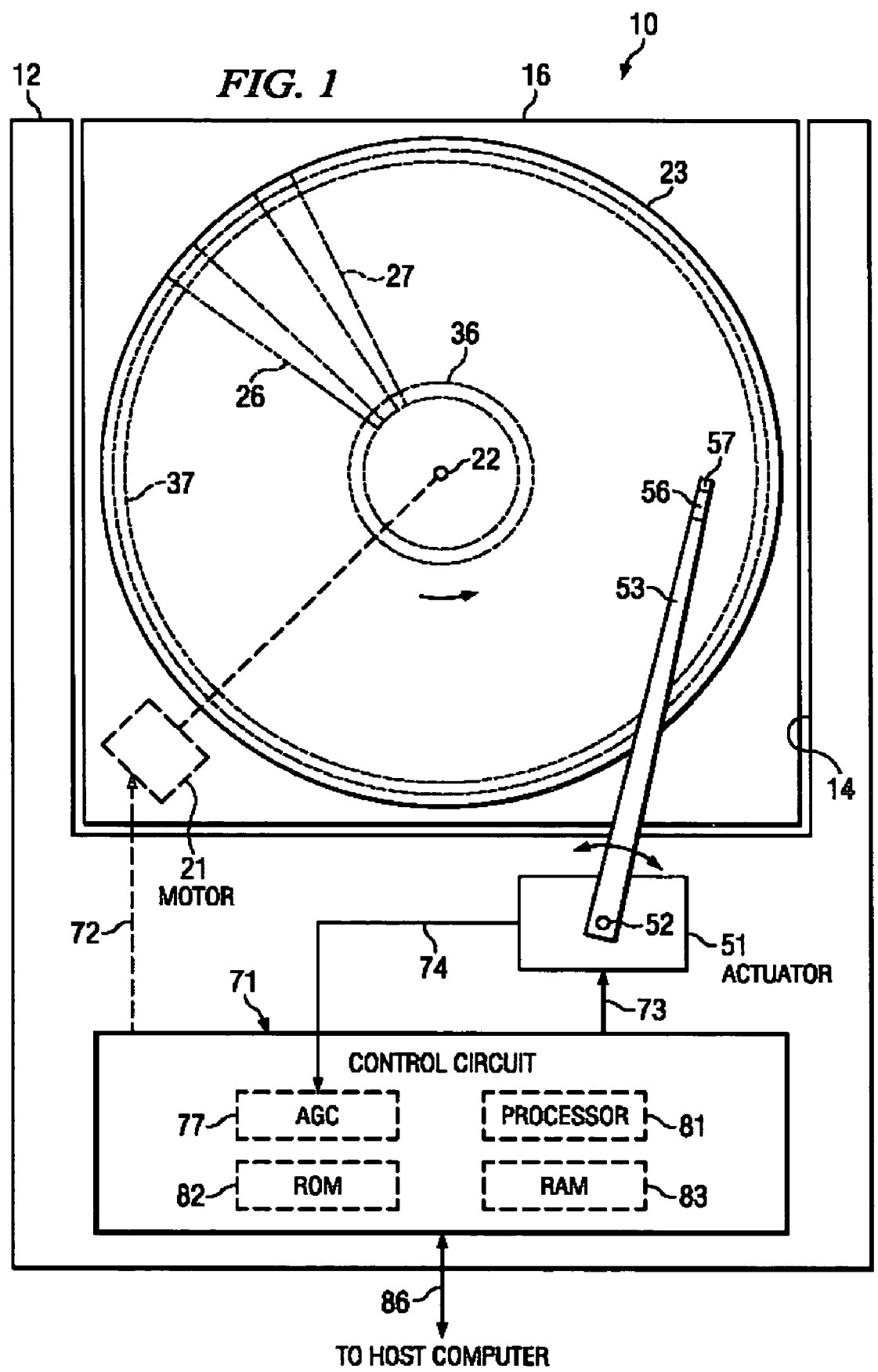
FIG. 1 is a diagrammatic view of an apparatus which is an information storage system that embodies aspects of the present invention.

FIG. 1 is a diagrammatic view of an apparatus which is an information storage system 10, and which embodies aspects of the present invention. The system 10 includes a receiving unit or drive 12 which has a recess 14, and includes a cartridge 16 which can be removably inserted into the recess 14.

The cartridge 16 has a housing, and has within the housing a motor 21 with a rotatable shaft 22. A disk 23 is fixedly mounted on the shaft 22 for rotation therewith. The side of the disk 23 which is visible in FIG. 1 is coated with a magnetic material of a known type, and serves as an information storage medium. This disk surface is conceptually divided into a plurality of concentric data tracks. In the disclosed embodiment, there are about 50,000 data tracks, not all of which are available for use in storing user data.

The disk surface is also conceptually configured to have a plurality of circumferentially spaced sectors, two of which are shown diagrammatically at 26 and 27. These sectors are sometimes referred to as servo wedges. The portions of the data tracks which fall within these sectors or servo wedges are not used to store data. Data is stored in the portions of the data tracks which are located between the servo wedges. The servo wedges are used to store servo information of a type which is known in the art. The servo information in the servo wedges conceptually defines a plurality of concentric servo tracks, which have a smaller width or pitch than the data tracks. In the disclosed embodiment, each servo track has a pitch or width that is approximately two-thirds of the pitch or width of a data track. Consequently, the disclosed disk 23 has about 73,000 servo tracks. The servo tracks effectively define the positions of the data tracks, in a manner known in the art.

Data tracks are arranged in a concentric manner ranging from the radially innermost tracks 36 to the radially outermost tracks 37. User data is stored in the many data tracks that are disposed from the innermost tracks 36 to the outermost tracks 37 (except in the regions of the servo wedges).

The drive 12 includes an actuator 51 of a known type, such as a voice coil motor (VCM). The actuator 51 can effect limited pivotal movement of a pivot 52. An actuator arm 53 has one end fixedly secured to the pivot 52, and extends radially outwardly from the pivot 52. The housing of the cartridge 16 has an opening in one side thereof. When the cartridge 16 is removably disposed within the drive 12, the arm 53 extends through the opening in the housing, and into the interior of the cartridge 16. At the outer end of the arm 53 is a suspension 56 of a known type, which supports a read/write head 57. In the disclosed embodiment, the head 57 is a component of a known type, which is commonly referred to as a giant magneto-resistive (GMR) head. However, it could alternatively be some other type of head, such as a magneto-resistive (MR) head.

During normal operation, the head 57 is disposed adjacent the magnetic surface on the disk 23, and pivotal movement of the arm 53 causes the head 57 to move approximately radially with respect to the disk 23, within a range which includes the innermost tracks 36 and the outermost tracks 37. When the disk 23 is rotating at a normal operational speed, the rotation of the disk induces the formation between the disk surface and the head 57 of an air cushion, which is commonly known as an air bearing. Consequently, the head 57 floats on the air bearing while reading and writing information to and from the disk, without direct physical contact with the disk. As stated above, the distance the head floats above the disk is known as the "fly-height."

The drive 12 includes a control circuit 71, which is operationally coupled to the motor 21 in the cartridge 16, as shown diagrammatically at 72. The control circuit 71 selectively supplies power to the motor 21 and, when the motor 21 is receiving power, the motor 21 effects rotation of the disk 23. The control circuit 71 also provides control signals at 73 to the actuator 51, in order to control the pivotal position of the arm 53. At 74, the control circuit 71 receives an output signal from the head 57, which is commonly known as a channel signal. When the disk 23 is rotating, segments of servo information and data will alternately move past the head 57, and the channel signal at 74 will thus include alternating segments or bursts of servo information and data.

The control circuit 71 includes a channel circuit of a known type, which processes the channel signal received at 74. The channel circuit includes an automatic gain control (AGC) circuit, which is shown at 77. The AGC circuit 77 effect variation, in a known manner, of a gain factor that influences the amplitude of the channel signal 74. In particular, the AGC circuit uses a higher gain factor when the amplitude of the channel signal 74 is low, and uses a lower gain factor when the amplitude of the channel signal 74 is high. Consequently, the amplitude of the channel signal has less variation at the output of the AGC circuit 77 than at the input thereof.

The control circuit 71 also includes a processor 81 of a known type, as well as a read only memory (ROM) 82 and a random access memory (RAM) 83. The ROM 82 stores a program which is executed by the processor 81, and also stores data that does not change. The processor 81 uses the RAM 83 to store data or other information that changes dynamically during program execution.

The control circuit 71 of the drive 12 is coupled through a host interface 86 to a not-illustrated host computer. The host computer can send user data to the drive 12, which the drive 12 then stores on the disk 23 of the cartridge 16. The host computer can also request that the drive 12 read specified user data back from the disk 23, and the drive 12 then reads the specified user data and sends it to the host computer. In the disclosed embodiment, the host interface 86 conforms to an industry standard protocol which is commonly known as the Universal Serial Bus (USB) protocol, but could alternatively conform to any other suitable protocol, including but not limited to the IEEE 1394 protocol.

As the heads 57 get dirty, the fly height decreases. The decrease in the fly height increases the friction between the heads 57 and the disk 23, which causes an increase in the head drag force exerted on the disk 23. As a result of the increased head drag force, the driving current of the motor 21 also increases to maintain the adequate spindle rotation speed. This increase in motor drive current can be measured and used as a fly height decrease indicator.

Figure 2:
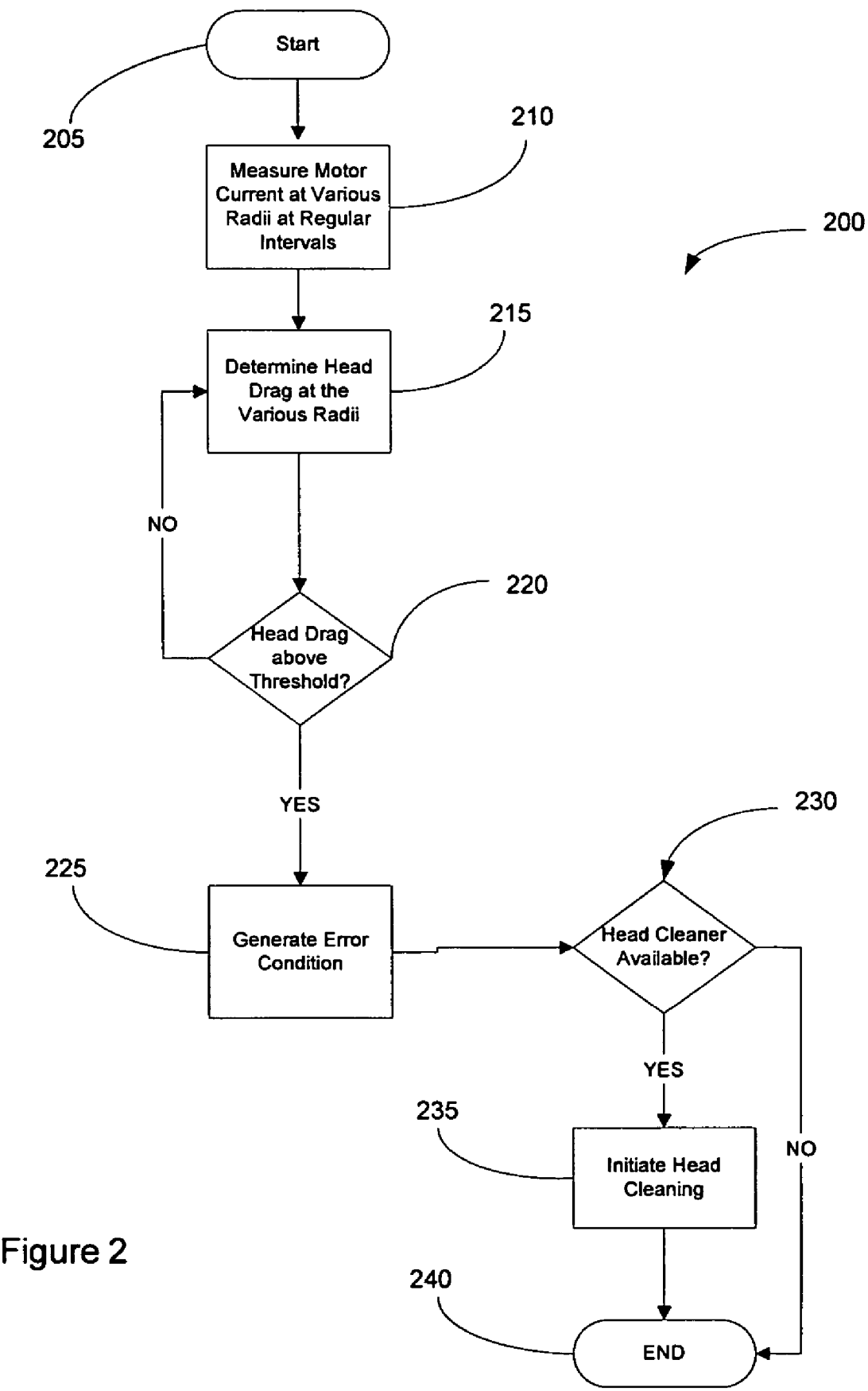
FIG. 2 is a flowchart illustrating a process for determining fly height decrease in a disk drive by determining head drag.

FIG. 2 is a flowchart showing the process 200 for detecting the fly height change in the present invention using the motor drive current. The process 200 begins at a START block 205. Proceeding to block 210, the process 200 measures a motor current of the drive 12 at various radii at regular intervals. The motor current and the various radii may be stored in memory for comparison purposes.

Proceeding to block 215, the process 200 determines the head drag of the drive 12 at the various radii. As stated above, over time the heads 57 of the drive 12 may get dirty and thereby increase the head disk friction. Any change in head disk friction will change the head drag exerted on the disk. As a result, the driving current to the spindle motor has to be adjusted to maintain the proper spindle rotation speed. The head drag may therefore be determined from the motor current.

In addition, the absolute motor current value may depend on temperature, spin time, elevation, and supply voltage. A more accurate measurement of head drag can be calculated by making motor current measurement with head unloaded from the media as well.

For CSS (contact start stop) hard drives where the recording heads can not be removed from the disk, the difference between motor currents at different radii can be calculated and used as criteria. These differences represent the difference in head drag at different radii. Since for most slider design accumulation of debris on slider will affect the fly height differently at different radii, the head drag difference will change due to debris build up.

Proceeding to block 220, the calculated head drag is compared to a threshold value. The threshold value may be selected in a variety of manners, including being predetermined, measured, or calculated. If the head drag is below the threshold value, the process 200 proceeds along the NO branch back to block 215 to re-calculate the head drag at an appropriate interval. If the change in the head drag is above the threshold value, the process 200 proceeds along the YES branch to block 225 where an error condition is generated by the drive 12.

Proceeding to block 230, the process 200 determines whether the drive 12 has a head cleaner. If the drive 12 has a head cleaner, the process 200 proceeds along the YES branch to block 235 where a head cleaning procedure is initiated. As stated above, if the heads 57 of the drive 12 get dirty, then the head drag may be changed. By cleaning the heads 57, the fly height should return to normal and the head disk friction should therefore return to a value close to the baseline level. After the head cleaning is initiated, or if the drive 12 is determined not to have a head cleaner available in block 230, the process terminates in END block 245.

Numerous variations and modifications of the invention will become readily apparent to those skilled in the art. Accordingly, the invention may be embodied in other specific forms without departing from its spirit or essential characteristics.

What is claimed is:

1. A method for detecting a change in fly-height comprising:

measuring a motor current at one or more radii;

determining head drag from the motor current;

comparing the head drag to a predetermined value; and determining a decrease in fly-height if the change in head drag is greater than the predetermined value.

2. The method of claim 1, further comprising generating an error condition upon determination of the decrease in fly-height.

3. The method of claim 1, further comprising initiating a head cleaning procedure upon determination of the decrease in fly-height.

4. The method of claim 1, further comprising measuring the head current at an inner-diameter and outer diameter of a disk.

5. The method of claim 1, further comprising measuring a corresponding motor current with the heads off the disk.

6. The method of claim 5, further comprising determining a head drag for the parked condition.

7. The method of claim 6, further comprising initiating a head cleaning upon generation of the error condition.

8. A method of initiating head cleaning in a disk drive comprising:

establishing a baseline head drag;

measuring a transient head drag; and calculating change in head drag and initiating head cleaning if the change in head drag exceeds a threshold.

9. The method of claim 8, wherein the head drag is measured at an inner diameter of the disk drive.

10. The method of claim 8, further comprising measuring the head drag at a plurality of different radii of the disk drive.

11. The method of claim 10, further comprising generating an error condition and canceling the head cleaning if the change in head drag exceeds the threshold at all the plurality of different radii.

* * * * *